Figure 1:
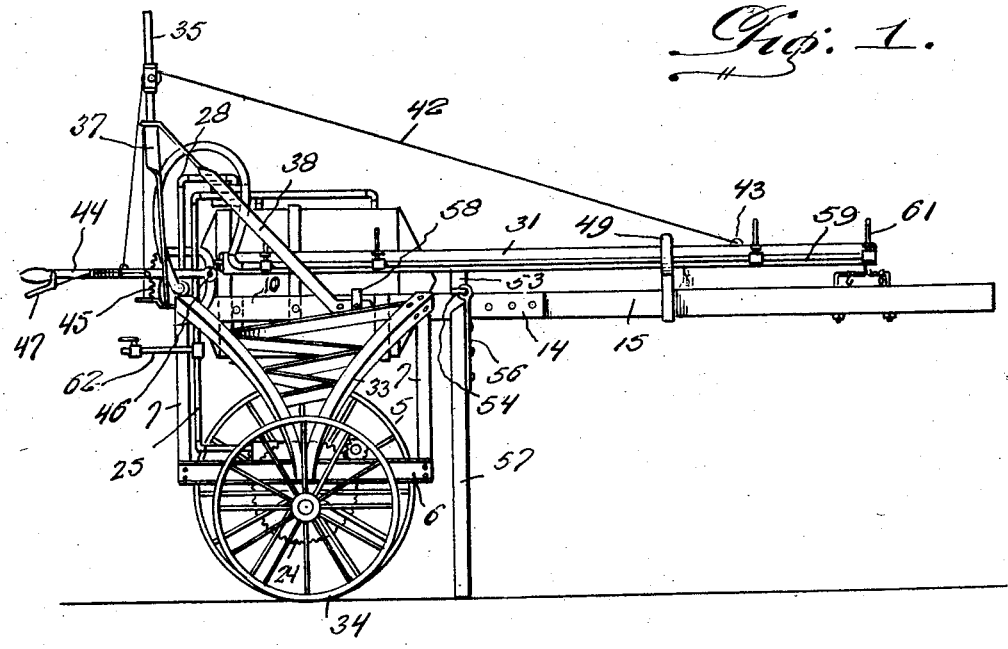

June 21, 1927.

A. F. STUBENBERG

SPRAYING MACHINE

Filed Feb. 16, 1926

1,633,294

3 Sheets-Sheet 1

Inventor
A. F. Stubenberg,
By Clarence A. O'Brien
Attorney

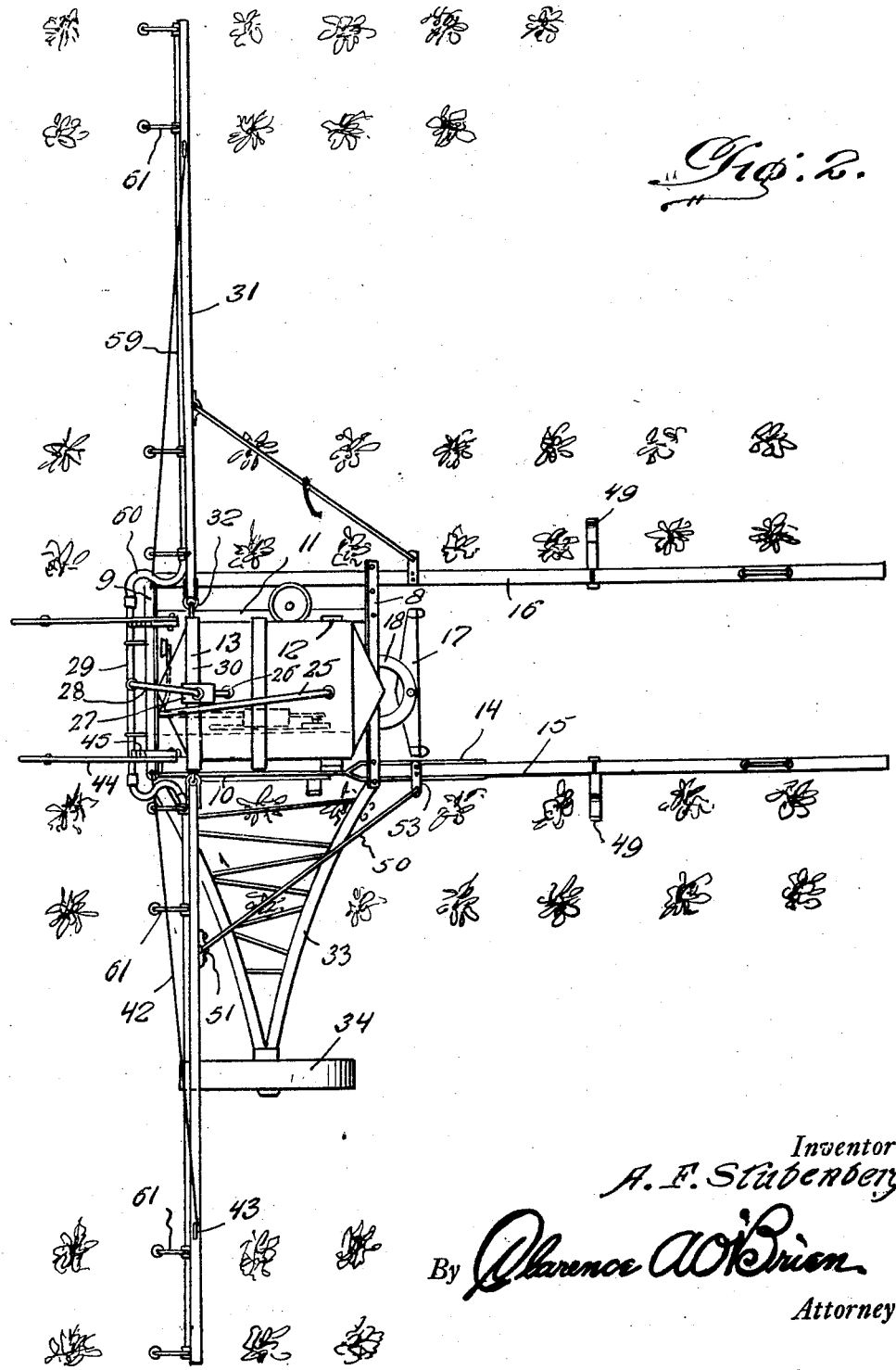

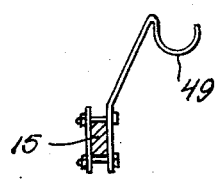
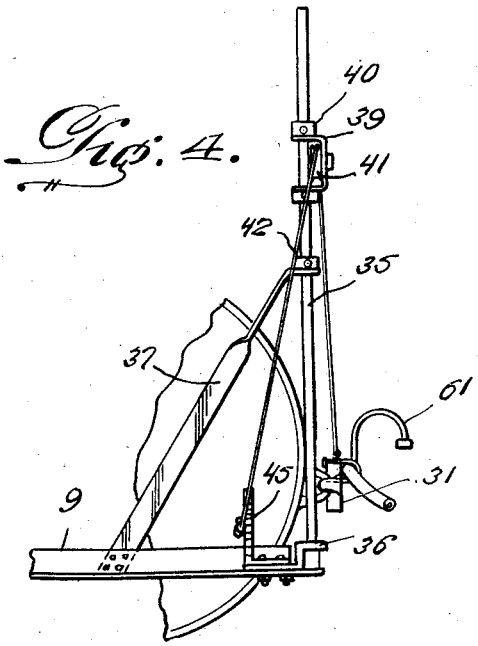
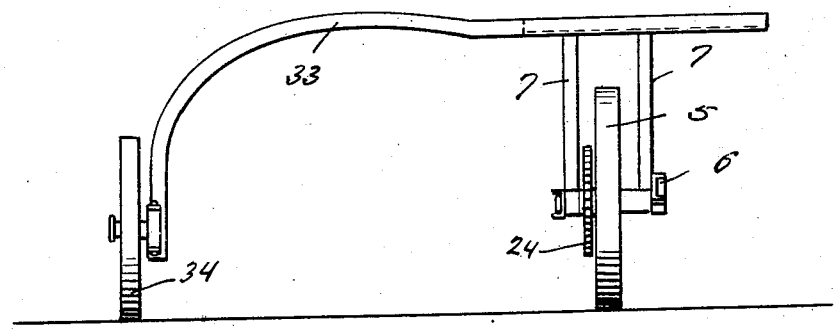
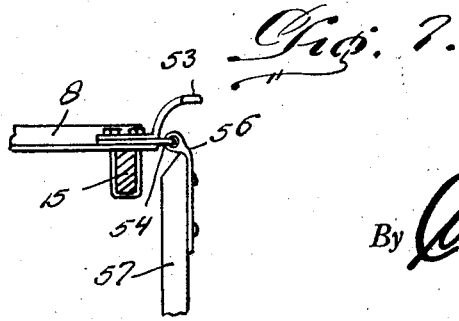

Patented June 21, 1927.

1,633,294

UNITED STATES PATENT OFFICE.

ARTHUR FRANK STUBENBERG, OF MAUNAWAI, TERRITORY OF HAWAII.

SPRAYING MACHINE.

Application filed February 16, 1926. Serial No. 88,602.

The present invention relates to a horse-drawn spraying machine for applying liquid spraying materials to pineapple plants, berry plants, small fruit trees, vines, vegetables, or similar crops.

The machine shown and described herein is designed particularly for spraying pineapple plants. In this class of work, conditions are such that the machine must be operated in a very limited space between the rows, and great care must be exercised to see that the plants or the leaves of the plants are not damaged.

The outrigger wheel of my improved machine maintains the same in an upright position. Without this outrigger wheel it would be necessary to have one man to balance the machine with a lever or handle when operating. The improved machine shown herein is operated by one man and one horse. The spraying unit consists of an air tight metal or wood tank, an air compressor, and spray arms or booms. The air compressor, which is driven from the wheel that carries the machine, supplies the necessary pressure for forcing the solution out of the tank to the nozzles. The size and speed of the air compressor depends on the pressure required, or the number of nozzles used. The machine is equipped with booms or spray arms which can be swung in or out by levers at the rear of the machine, and are adjustable to any height up to eight feet from the ground. Any type of spray nozzles may be used. The machine shown herein, as already mentioned, is designed particularly for spraying pineapple plants, but it is readily adapted to the spraying of any other crops that are planted in rows. The spraying unit can, also, be mounted in the rear of any ordinary farm wagon and driven by sprocket and chains from the wheel of the wagon.

The advantages of this machine are as follows: It is simple and compact and has a large capacity. It can be used between rows where the space for operating is limited, and handles a large number of rows at one time. It is operated with the minimum labor and power, one man and one horse only being required. The air compressor supplies a uniform and reliable pressure. Some spraying solutions are very destructive to metals and the life of cylinders and moving parts are not very long in handling such chemicals. The air compressor is operated without any auxiliary power, being driven by the single carrying wheel of the machine.

The machine has a wide range of adjustment of spraying means, which are made with a minimum of effort. It performs its work with very little likelihood that the machine will get out of order.

With the above and numerous other objects in view as will appear as the description proceeds, the invention resides in certain novel features of construction, and in the combination and arrangement of parts as will be hereinafter more fully described and claimed.

In the drawings:—

Figure 3:
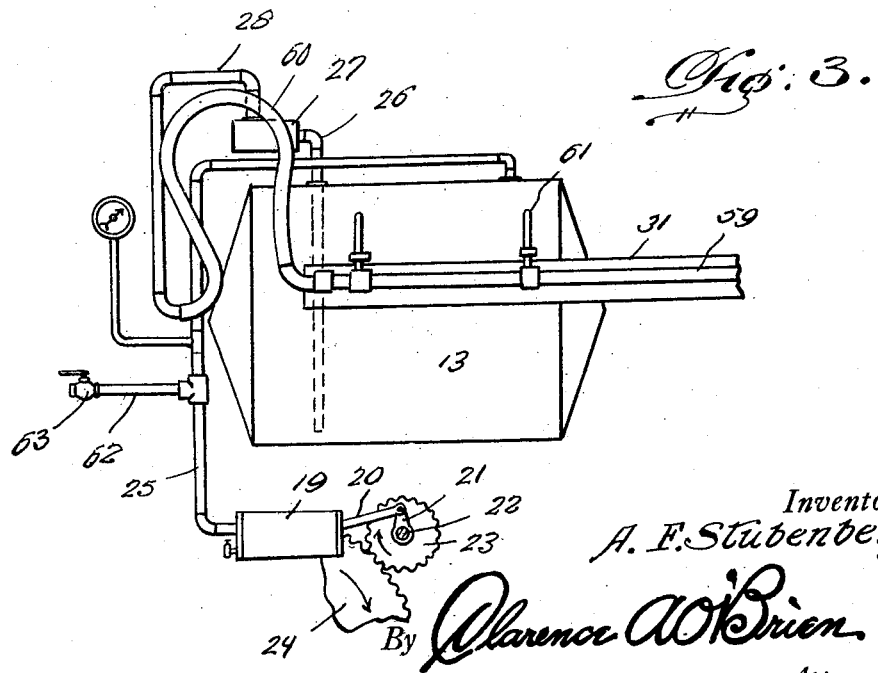

Figure 1 is a side elevation of the machine embodying the features of my invention showing the boom extending longitudinally thereof, Figure 2 is a top plan view of the machine showing the beam extended transversely of the machine, Figure 3 is a fragmentary detail side elevation showing the tank and air compressor, Figure 4 is an enlarged detail fragmentary elevation showing the hoisting means for the beams, Figure 5 is a detail elevation showing the wheel supports, Figure 6 is a detail section showing in elevation one support for a boom, and Figure 7 is a detail section showing the mounting of one of the props.

Referring to the drawings in detail, it will be seen that 5 designates the main supporting wheel which is journaled in any suitable manner between the longitudinally extending frame bars 6 supporting uprights 7, cross frame bars 8 and 9 are supported on the uprights. A frame beam 10 extends between the ends of the cross bars 8 and 9. A beam 11 extends between intermediate portions of the bars 8 and 9 a distance from the other ends of said bars, being disposed between said other ends and the centers of said bars. Cradle bars 12 are supported by the beams 10 and 11 for supporting the tank 13. The forward end of the beam 10 is bifurcated as at 14 for receiving the rear end of a shaft 15. The other shaft 16 is attached to said other ends of the cross bars 8 and 9. The whiffle tree 17 is disposed off center between the shafts 15 and 16 by means of a suitable bracket 18 attached to the forward cross bar 8.

An air compressor 19 is supported in any suitable manner on one of the bars 6, and the operating pitman 20 thereof is engaged with a crank 21 on the shaft 22 of a pinion 23. A gear 24 is rotatable with the main wheel 5, and meshes with the pinion 23 so that as the machine travels along said air compressor is placed in operation. A pipe 25 leads from the air compressor to the tank 13. A pipe 26 leads from the tank, that is extends through the top thereof and terminates adjacent the bottom thereof as is clearly indicated in dotted lines in Figure 3, and communicates with a receptacle 27 from which leads a pipe 28 to a pipe 29 extending transversely of the rear of the machine.

A band 30 is disposed about the rear end of the tank 13 and booms 31 are pivotally engaged therewith as at 32 in any suitable manner.

A frame 33 extends from one side of the main frame and is curved downwardly and supports on its lower and outer extremity an outrigger wheel 34. This outrigger wheel maintains the machine in an upright position without the necessity of any further balancing means. The frame 33 as is clearly shown in Figure 5 is so curved as to straddle one or more rows of the plants.

At each rear corner of the main frame there is mounted a vertical rotatable shaft 35, the lower end of which is journaled in a bracket 36. A brace 37 extends upwardly from the rear cross bar 9, and a brace 38 extends from the beam 10, 11, and the shaft 35 is journaled therethrough, that is at the upper ends thereof. A bracket 39 is fixed to the shaft 35 adjacent the upper end thereof by collars, or in any other suitable manner. A sheave 41 is journaled in the bracket 39. A cable 42 is trained over the sheave 41 and has one end attached to the adjacent boom as at 43, while the other end is attached to a lever 44. The lever 44 is pivoted on the bracket 45, as at 46 and has the well known manually releasable dog structure indicated generally at 47 for engagement with teeth provided in the bracket 45, so that the lever may be held in different adjusted positions. By the use of this lever the boom may be easily swung upwardly when in the position shown in Figure 1 to free it from engagement with a bracket 49 which is carried on the shafts 15, 16, so that the boom may be swung to the position shown in Figure 2. When in the position shown in Figure 2, an arm 50 which is pivoted thereto as at 51 may have its end engaged in bracket 53 mounted on the shafts 15, 16. Below the bracket 53 there is another bracket 54 to which is pivoted the strap 56 supporting a prop 57 for holding the machine when the same is not supported by a horse. This prop 57 may be swung to rest in a bracket 58 when the same is not in use.

A pipe 59 extends longitudinally along each boom 31 and is connected with the adjacent end of the pipe 29 by a flexible hose 60. Suitable nozzles 61 project from the pipe 59 for spraying the rows as indicated to advantage in Figure 2. A branch pipe 62 extends from the pipe 25 and has a valve 63 therein. By opening this valve 63, the air compressed by the air compressor 19 may be allowed to escape so that no spraying material will be forced from the tank 13.

It is thought that the construction, operation, and advantages of this machine will now be clearly understood without a more detailed description thereof. It is desired, however, to point out that the machine is exceptionally compact and convenient in its construction and in its operation.

The present embodiment of the invention has been disclosed merely by way of example since in actual practice it attains the features of advantage enumerated as desirable in the statement of the invention, and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what I claim as new is:—

1. A device of the class described including, in combination, a main frame, a supporting wheel journaled in said main frame, a cradle structure in said main frame, a tank supported in said cradle structure, an air compressor supported in said main frame and operatively associated with said supporting wheel, a line connecting the air compressor and the tank, a band disposed about the tank, a pair of beams pivotally engaged with the band on diametrically opposite sides of the tank, pipes extending along the beams and having nozzles projecting therefrom, means connecting the pipes with the tank.

2. A device of the class described including, in combination, a main frame, a supporting wheel journaled in said main frame, a cradle structure in said main frame, a tank supported in said cradle structure, an air compressor supported in said main frame and operatively associated with said supporting wheel, a line connecting the air compressor and the tank, a band disposed about the tank, a pair of beams pivotally engaged with the band on diametrically opposite sides of the tank, pipes extending along the beams and having nozzles projecting therefrom, means connecting the pipes with the tank, standards journaled in the rear of the main frame to extend vertically, sheaves journaled on the standards, levers pivoted on the rear of the main frame, and cables attached to the levers and to the booms and trained over the sheaves.

3. A device of the class described including, in combination, a main frame, a supporting wheel journaled in said main frame, a cradle structure in said main frame, a tank supported in said cradle structure, an air compressor supported in said main frame and operatively associated with said supporting wheel, a line connecting the air compressor and the tank, a band disposed about the tank, a pair of beams pivotally engaged with the band on diametrically opposite sides of the tank, pipes extending along the beams and having nozzles projecting therefrom, means connecting the pipes with the tank, standards journaled in the rear of the main frame to extend vertically, sheaves journaled on the standards, levers pivoted on the rear of the main frame, cables attached to the levers and to the booms and trained over the sheaves, rods pivotally engaged with said booms, brackets on the frame for receiving said rods to hold said booms extended transversely of said frame.

4. A spraying machine of the class described, including in combination, a pair of frame bars, a supporting wheel journaled between the frame bars, a plurality of uprights on the frame bars, a pair of beams on the upper ends of the uprights, cross bars on the ends of the beams, shafts attached to the cross bars and extending forwardly in spaced parallel relation, a cradle on the beams, a tank supported in the cradle, an air compressor supported on one of the frame bars and operatively connected with the wheel, a line connecting the air compressor with the tank, a band disposed about the rear end of the tank, booms pivotally engaged on said band, a pair of standards journaled at their bottom ends in the rear cross bar, braces extending from the rear cross bar and beams, said last mentioned shafts being journaled through said braces, sheaves journaled on the upper ends of said last mentioned shafts, levers pivotally mounted on the rear cross bar, cables trained over the sheaves and attached at their ends to the booms and to the levers.

5. A spraying machine of the class described, including in combination, a pair of frame bars, a supporting wheel journaled between the frame bars, a plurality of uprights on the frame bars, a pair of beams on the upper ends of the uprights, cross bars on the ends of the beams, shafts attached to the cross bars and extending forwardly in spaced parallel relation, a cradle on the beams, a tank supported in the cradle, an air compressor supported on one of the frame bars and operatively connected with the wheel, a line connecting the air compressor with the tank, a band disposed about the rear end of the tank, booms pivotally engaged on said band, a pair of standards journaled at their bottom ends in the rear cross bar, braces extending from the rear cross bar and beams, said last mentioned shafts being journaled through said braces, sheaves journaled on the upper ends of said last mentioned shafts, levers pivotally mounted on the rear cross bar, cables trained over the sheaves and attached at their ends to the booms and to the levers, rods pivotally engaged with said beams and detachably engaged with said first mentioned shafts to hold said booms extended transversely from the spraying machine.

6. A spraying machine of the class described, including in combination, a pair of frame bars, a supporting wheel journaled between the frame bars, a plurality of uprights on the frame bars, a pair of beams on the upper ends of the uprights, cross bars on the ends of the beams, shafts attached to the cross bars and extending forwardly in spaced parallel relation, a cradle on the beams, a tank supported in the cradle, an air compressor supported on one of the frame bars and operatively connected with the wheel, a line connecting the air compressor with the tank, a band disposed about the rear end of the tank, booms pivotally engaged on said band, a pair of standards journaled at their bottom ends in the rear cross bar, braces extending from the rear cross bar and beams, said last mentioned shafts being journaled through said braces, sheaves journaled on the upper ends of said last mentioned shafts, levers pivotally mounted on the rear cross bar, cables trained over the sheaves and attached at their ends to the booms and to the levers, rods pivotally engaged with said beams and detachably engaged with said first mentioned shafts to hold said booms extended transversely from the spraying machine, a frame structure projecting laterally from the machine and curved downwardly at its outer extremity, and an outrigger wheel journaled on said outer extremity.

7. A device of the class described, including in combination, a wheeled supporting frame, a tank supported on said frame, a band disposed about the tank a pair of beams pivotally engaged with the band on diametrically opposite sides of the tank, pipes extending along the beams and having nozzles projecting therefrom, means connecting the pipes with the tank, and means for swinging the beams.

8. A device of the class described including in combination, a wheeled supporting frame, a tank supported on said frame, a band disposed about the tank, a pair of beams pivotally engaged with the band on diametrically opposite sides of the tank, pipes extending along the beams and having nozzles projecting therefrom, means connecting the pipes with the tank, standards journaled in the rear of the frame and extending vertically, sheaves journalled on the standards, levers pivoted on the rear of the frame, and cables attached to the levers and to the beams, and trained over the sheaves.

In testimony whereof I affix my signature.

ARTHUR FRANK STUBENBERG.